United States Patent [19]

Marto

[11] 4,151,701
[45] May 1, 1979

[54] TURF THATCHER

[75] Inventor: John H. Marto, Oshkosh, Wis.

[73] Assignee: J. I. Case Company, Racine, Wis.

[21] Appl. No.: 878,252

[22] Filed: Feb. 16, 1978

[51] Int. Cl.² .............................................. A01D 77/00
[52] U.S. Cl. ...................................... 56/16.1; 56/396; 56/400; 172/393
[58] Field of Search ......... 56/16.1, 375, 376, 396–398, 56/400, 400.14, 400.15, 10.2; 172/618, 620–622, 387, 389–393

[56] References Cited

U.S. PATENT DOCUMENTS

| | | | |
|---|---|---|---|
| 358,735 | 3/1887 | Doan | 56/376 |
| 1,925,397 | 9/1933 | Meyer | 172/387 |
| 2,502,769 | 4/1950 | Warnke | 56/400 |
| 2,764,163 | 9/1956 | Thys | 56/400 |
| 3,438,183 | 4/1969 | Puretic | 56/16.1 |
| 3,710,872 | 1/1973 | Kovar | 56/400 |
| 3,765,159 | 10/1973 | Neff | 56/400 |

*Primary Examiner*—Jay N. Eskovitz
*Attorney, Agent, or Firm*—Arthur J. Hansmann

[57] ABSTRACT

A turf thatcher having a mobile frame including a shaft on which a plurality of springs are mounted and extend down to the turf for dragging through the turf and removing the thatch therefrom. A pawl is movably mounted on the frame and is in a dragging position when the thatcher moves forward and engages the turf and raises the entire frame when the thatcher moves rearward to thus lift the thatching members off the turf in that rearward direction of movement.

3 Claims, 6 Drawing Figures

TURF THATCHER

This invention relates to a turf thatcher, and, more particularly, it relates to a thatcher having spring type of thatching members and having a lifting member which raises the thatcher away from the turf when the thatcher is moved rearwardly.

BACKGROUND OF THE INVENTION

The prior art is already aware of turf thatchers which are moved over the ground and which have thatching members in the form of fingers extending into the turf for raking or scratching the turf and removing the thatch therein. These thatchers can be towed by a tractor or riding type of vehicle, and they are therefore commonly of a powered nature to be dragged over the turf in the thatching process.

In the present invention, the thatcher is arranged with a frame or support member which is moved in a forward and a rearward direction and which has a plurality of spring fingers which extend down to the ground for thatching or raking the ground in the forward direction of movement. The springs are actually arranged to be flexible in their extent down to the ground and thus to flex rearwardly in the forward movement of the thatcher, and the springs are arranged on a V-shaped type of frame which therefore provides for an end-to-end uniformity of drag or towing force in the frame. Still further, the present thatcher is arranged to have an automatically operative lift member, in the nature of a pawl, which is inoperative in the forward direction of thatcher movement but which automatically becomes operative to lift the spring fingers off the turf in the rearward direction of thatcher movement.

Accordingly, the present invention has for its primary object the accomplishment of the aforementioned and to do so with a functionally reliable thatcher which is of a minimum of parts and is therefore simplified in its construction but yet has the desirable feature of spring fingers serving as thatcher members and having the automatic lift member when the thatcher is moved in the rearward direction and thus protects the thatcher from any damage and also avoids any undesirable thatching action when the thatcher is being moved rearwardly.

Accordingly, the present invention provides a thatcher which is made of a minimum of parts and which is self-adjusting with respect to the penetration of the turf in the thatching mode and which is self-adjusting for any wear or mis-alignment of the thatching members or fingers. Still further, the thatcher of this invention is provided with an automatically-operative lift member, in the form of a pawl as shown herein, wherein the lift member is automatically operative when the thatcher is reversed, to thus protect the thatcher from contact with any undesirable surface, such as a pavement or sidewalk or the like. Still further, the thatcher of the present invention is arranged with parts which are readily and easily replaceable when fully worn or damaged, and the entire thatcher is of inexpensive parts which provide for efficient thatching and for the automatic lifting or dis-engagement of the thatcher from the turf when the thatcher is moved rearwardly.

Other objects and advantages will become apparent upon reading the following description in light of the accompanying drawings.

DETAILED DESCRIPTION OF THE PREFERRED EMBODIMENT

Figure 1:
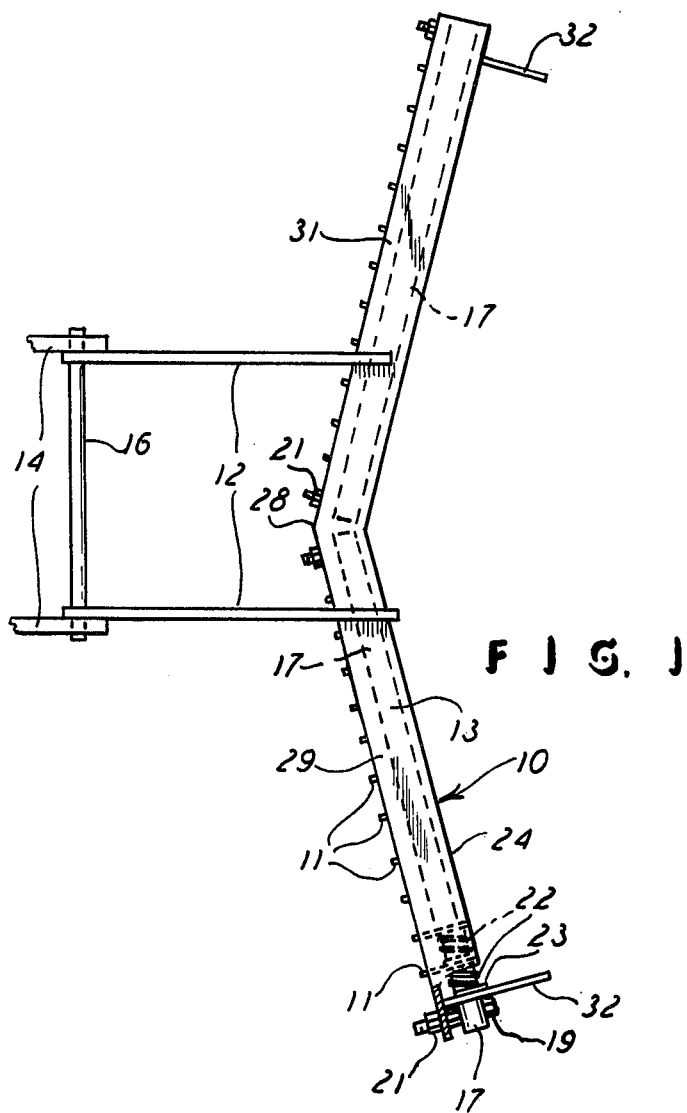
FIG. 1 is a top plan view of the thatcher of this invention and showing a fragment of a tractor attached therewith.
Figure 2:
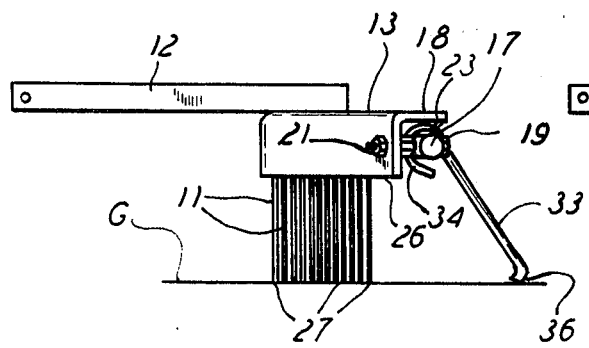
FIGS. 2 and 3 are side elevational views of the thatcher shown in FIG. 1, and with the parts thereof being the respective forward and rearward modes of operation.
Figure 3:
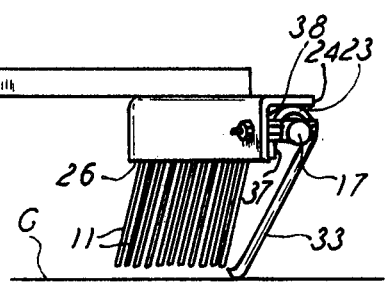

The drawings shown the thatcher which includes a frame generally designated 10 supporting thatcher members 11 which are in the form of fingers or straight lengths of springs depending from the frame 10 and extending down to the turf or ground line designated G. Vehicle members 12 are included as a part of the frame 10 and extend from the frame horizontally disposed angled piece 13 which is affixed with the hitch members 12. Thus, the thatcher as shown in FIGS. 1, 2, and 3 can be attached to a towing vehicle or tractor which is shown to have rearwardly extending arms 14 supporting a shaft 16 to which the forward ends of the hitch members 12 may be attached. Thus the thatcher is pivotally attached relative to the tractor 14 and pivots about the longitudinal axis of the attaching shaft 16 so that the frame 10 can move up and down, both for accommodating hills and valleys in the ground and for pivoting up and down between a lowered operative position and a raised inoperative position which are respectively shown in FIGS. 2 and 3.

The thatcher frame 10 also includes a horizontally-disposed shaft 17, shown in two lengths, which extends throughout the length of and spaced from and directly below the upper portion 18 of the angled piece 13. Bolts 19 are located along the frame piece 13 and extend through the angulated shafts 17, all as shown in FIG. 1, for supporting the shaft 17 as a part of the frame 10. A nut 21 is threaded onto the end of each bolt 19 and thus provides the end stop or limit for the hereinafter described parts which are strung onto the shaft 17.

A plurality of coiled springs 22 are disposed on the shaft 17 and have two or three turns extending around the shaft 17 and each of the springs 22 then extends in the depending straight ends 11 and in another straight end 23 which engages the rear edge 24 of the portion 18 of the angled piece 13. Of course the springs 22 are wrapped around the shaft 17 in a clockwise direction from the ends 11 and to the ends 23, as viewed in FIG. 2, and thus the springs 22 are secure with the frame 10, and the spring extending fingers or ends 11 extend past the edge 24 of the portion 13 of the frame 10, and thus the spring fingers 11 are limited by and guided by the lower edge 24 of that angled piece 13, and the fingers 11 can assume the inclined or angulated position shown in FIG. 3 when the fingers 11 are free of the turf or ground G, but they would then be abutting the edge 26 since the spring 22 can be under tension in their wrapping around the shaft 17 to thus position the springs 22 in a set position relative to the shaft 17.

It will of course therefore be understood that there are the plurality of springs 22 strung along the shaft 17, and each spring 22 terminates in a spring straight end or finger 11, and those fingers 11 of course extend down to terminal ends 27 which terminate on a horizontal plane, and thus the spring fingers 11 are of the same length as shown for uniform engagement of the turf or ground G in the thatching position of FIG. 2. Further, when the thatcher is in the thatching position as shown in FIG. 2, then the fingers 11 will be slightly flexed rearwardly so that they may be in the vertical position as shown in FIG. 2, rather than in the inclined position of FIG. 3.

FIG. 1 further shows that the frame 10 is V-shaped and has the apex thereof at the designated 28 and it extends in the two sides or legs 29 and 31 which are in trailing positions relative to the forward direction of movement of the frame 10, and that would of course be to the left as viewed in FIGS. 1, 2, and 3. With that V-shaped arrangement, there is a uniform resistance or drag provided by the thatcher itself relative to the vehicle 14, and thus there is balance of the forces relative to the vehicle 14. In this manner, even though the thatcher frame 10 extends considerably laterally of the vehicle 14, and since the thatcher of course engages the ground and thus has a resistance force and those extending frame end, there is no tendency to turn the thatcher or to create an unbalanced force relative to the tractor 14 and the entire machine will move directly forwardly.

Figures 5, 6:
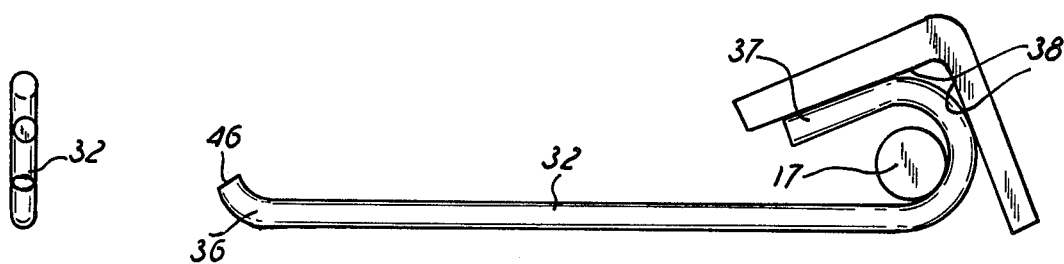
FIGS. 5 and 6 are side and end views, respectively, of the lift member shown in the previous figures.

A pawl or lift member 32 is supported on the frame 10 and is at each end thereof, as shown. The members 32 engaged the opposite ends of the angulated shaft 17 and depend therefrom in straight ends 33 which engage the ground G to drag along the ground and thus be inoperative in that dragging position which is shown in FIGS. 1 and 2. The upper end of the member 32 is shown to be formed in a loop 34 which encircles the shaft 17 to be permanently secured therewith but to be pivotal or swingable on the shat 17 between the FIG. 2 and FIG. 3 positions. Thus, when the thatcher is moving forwardly, the member 32 will drag along the ground and have no consequence relative to the function of the thatcher. However, when the thatcher is moved rearwardly, then the lift member 32 will have its lower end 36 engage the ground or supporting surface and then lift the entire thatcher upwardly from the FIG. 2 position to the FIG. 3 position. As such, the thatcher members 11 are lifted off the ground G and are thus rendered inoperative and are protected from sliding rearwardly on the ground G and thus are not damaged or are not worn when the thatcher may be moved over hard ground or pavement or the like. FIGS. 5 and 6 show the detail of the pawl or lift member 32 and it will be seen that it is of a rigid rod material and the shaft 17 is shown relative to the lift member 32 in FIG. 5. As such, the member 32 is a pawl and thus acts in the nature of a pawl to be ineffective in one direction, namely the forward direction but to be effective in the other direction, namely the rearward direction of thatcher movement, and the extent of the member 32 from the shaft 17 in its straight portion designated 33 is greater than the length or extent of the spring fingers 11, as shown and as indicated in FIG. 3. FIG. 3 also shows that the lift member 32 has its end 37 extended tangentially of the loop 34 shown adjacent the surface 38 to where the end 37 will engage the surface 38 of the angled piece 13, and there is thus a stop or abutment for the lift member 32 to secure it in the FIG. 3 position and prevent it from further counterclockwise rotation about the shaft 17 between the FIG. 2 and FIG. 3 positions and thus the member 32 will function as the lift member for the thatcher, as described. Further, it will be seen and understood that the longitudinal axis of the lift member straight length 33 is at an angle less than 45 degrees relative to the vertical plane passing through the axis of the mounting shaft 17, and thus the lift member 32 is secure and reliable in its function for engaging the ground when the thatcher is moved rearwardly and not simply slid over the ground when it is intended that the lift member 32 raise the thatcher for the rearward movement described herein.

Figure 4:
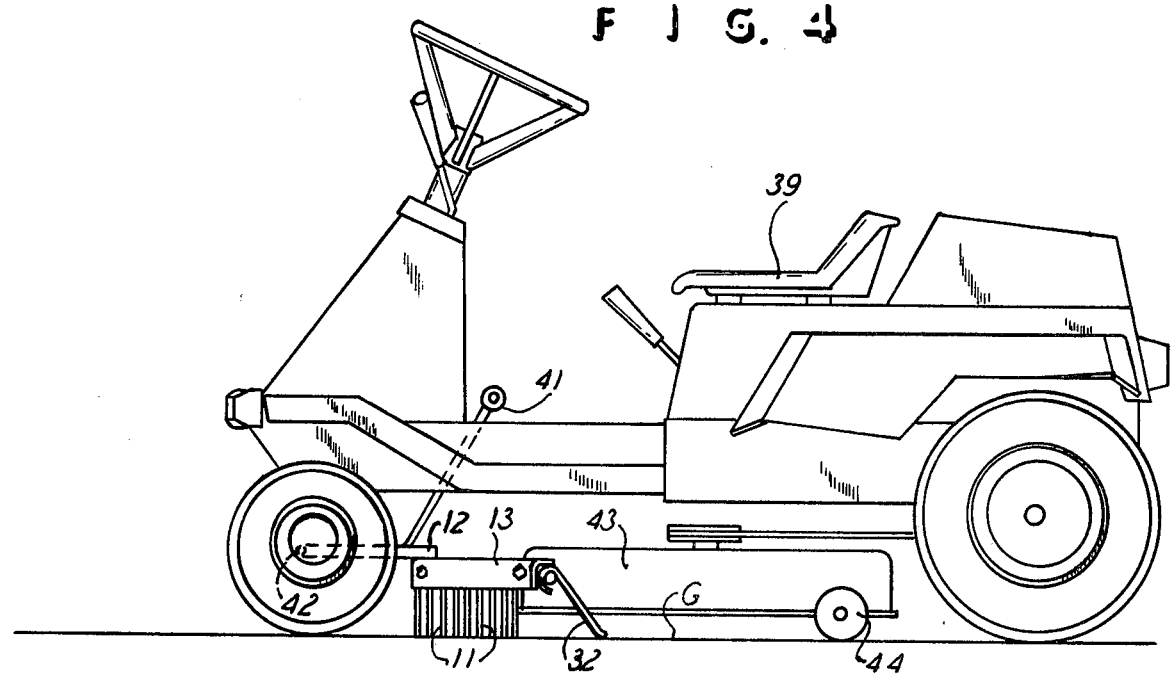
FIG. 4 shows a riding type tractor or lawn mower with the thatcher of this invention disposed forwardly thereof.

FIG. 4 shows the thatcher with its frame 10 and the spring fingers 11 and the lift member 32 and the frame members 12 all supported by and connected with a tractor which may be of the small riding type, such as a riding lawn mower, and designated 39. In that arrangement, the thatcher is shown underneath the vehicle. Further, there may be a controlled lift member 41 mounted on the vehicle 39 and attached with the thatcher frame pieces 12, all for upwardly supporting the thatcher and permitting the operator to pivot the thatcher about its pivot mounting 42 underneath the tractor. A conventional lawnmower 43 is also supported underneath the tractor 39 and directly behind the thatcher, in any conventional manner, such as ground-supported by at least one wheel 44. Other than as described above, the thatcher would function and have the same features as described in connection with FIGS. 1, 2 and 3.

Therefore, the thatcher is provided to have its thatcher members 11 disposed in a line oblique to the fore-and-aft direction of the thatcher, and the supporting shaft 17 also extends in that oblique angle and forms the V-shape as described, and the springs 22 have their coiled central portions and their extending ends 11 and 23 which respectively abut the portions or edges of the angled frame piece 13, as shown and described. Finally, the lift member 32 is curved or offset at its end 36 for positively engaging the ground in the rearward direction of thatcher movement by having the edge 46 firmly engage the ground and avoid sliding thereover when it is desired to raise the thatcher as shown in FIG. 3.

What is claimed is:

1. A turf thatcher comprising a liftably-mounted mobile frame movable over turf in a forward direction and a rearward direction, thatcher members supported on said frame and extending therebelow for contacting the turf and removing thatch therefrom, a horizontally disposed mounting shaft on said frame, an elongated rod having a circular loop in one end and with said loop extending over said mounting shaft and pivotal thereon, said rod having an elongated portion extending from one end of said loop and extending to the turf to freely slide thereover in the forward direction of movement of said frame, said rod elongated portion being of an extent to be movable to a position beyond the extent of said thatcher members relative to the turf when said frame is moved in the rearward direction and whereby said rod then lifts said thatcher members off the turf, and a stop disposed adjacent said loop, said rod having a tangential portion extending straight from the other end of said loop in a length shorter than said elongated portion and disposed to be in engagement with said stop when said frame is moved in the rearward direction for positioning said rod in the lifting position.

2. The turf thatcher as claimed in claim 1, wherein said rod includes a curved end at its lower end which is disposed opposite said loop, and the curvature of said curved end being to the same side of said elongated portion that said loop is on, and said curved end terminating in an edge on the ground and for engaging the ground in the rearward movement of said frame to secure said rod on the ground in the lifting of said frame.

3. The turf thatcher as claimed in claim 1, wherein said thatcher members are disposed in a line oblique to the fore-and-aft direction of said thatcher, and said rod is loosely fitted onto said shaft and is movably supported on said shaft to move in the plane of the fore-and-aft direction of movement of said frame.

* * * * *